United States Patent [19]
McDougall et al.
[11] 3,829,963
[45] Aug. 20, 1974

[54] METHOD OF FABRICATING A COMPOSITE SUPERCONDUCTOR INCLUDING A SUPERCONDUCTIVE INTERMETALLIC COMPOUND

[75] Inventors: Ian Leitch McDougall, Aldridge; Anthony Clifford Barber, Lichfield, both of England

[73] Assignee: Imperial Metal Industries (Kynoch) Limited, Birmingham, England

[22] Filed: Jan. 24, 1972

[21] Appl. No.: 220,057

[30] Foreign Application Priority Data
Feb. 4, 1971 Great Britain 3936/71

[52] U.S. Cl. 29/599, 148/127, 174/126 CP, 174/DIG. 6, 335/216
[51] Int. Cl. H01v 11/14
[58] Field of Search 29/599; 74/126 CP, DIG. 6; 335/216; 148/127

[56] References Cited

UNITED STATES PATENTS

| | | | |
|---|---|---|---|
| 3,218,693 | 11/1965 | Allen et al. | 29/599 |
| 3,397,084 | 8/1968 | Krieglstein | 117/217 |
| 3,625,662 | 12/1971 | Roberts et al. | 29/599 X |
| 3,652,967 | 3/1972 | Tanaka et al. | 335/216 |
| 3,674,553 | 7/1972 | Tachikawa et al. | 29/599 X |
| 3,699,647 | 10/1972 | Bidault et al. | 29/599 |
| 3,731,374 | 5/1973 | Suenaga et al. | 29/599 |
| 3,778,894 | 12/1973 | Kono et al. | 29/599 |

FOREIGN PATENTS OR APPLICATIONS

| | | | |
|---|---|---|---|
| 1,039,316 | 8/1966 | Great Britain | 29/599 |

*Primary Examiner*—Charles W. Lanham
*Assistant Examiner*—D. C. Reiley, III
*Attorney, Agent, or Firm*—Cushman, Darby & Cushman

[57] ABSTRACT

A method of manufacturing a superconductor comprising a superconductive intermetallic compound of at least two elements, includes the steps of producing a composite precursor comprising at least one filament which comprises one of said elements and is embedded in and supported by a matrix material, coverting at least part of the matrix material to a substance comprising the remainder of said elements, and reacting together said elements to produce said compound.

14 Claims, 1 Drawing Figure

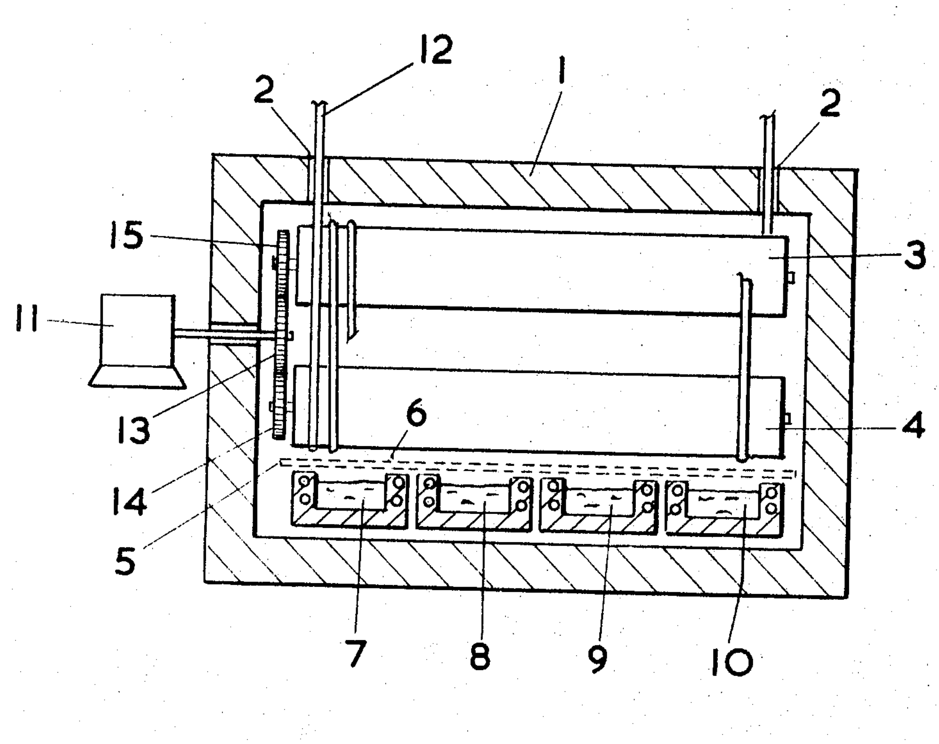
12
2
1
2
15
3
11
13
6
4
14
5
7
8
9
10

METHOD OF FABRICATING A COMPOSITE SUPERCONDUCTOR INCLUDING A SUPERCONDUCTIVE INTERMETALLIC COMPOUND

This invention relates to superconductors and methods of manufacture thereof.

SUMMARY OF THE INVENTION

In accordance with the present invention, a method of manufacturing a superconductor comprising a superconductive intermetallic compound of at least two elements, includes the steps of producing a composite precursor comprising at least one filament which comprises at least one of said elements and is embedded in and supported by a matrix material, converting at least part of the matrix material to a substance including the remainder of said elements, and reacting together said elements to produce said compound.

The remainder of said elements may be added to the matrix material and diffused therethrough. The said elements may be added by vapour deposition on to the matrix material.

The matrix material may contain none of the remainder of the elements or may contain a small portion of the remainder of the elements. The matrix material may be chosen from the group copper, silver and nickel.

The at least one filament may be formed of niobium. The vapour deposited material may be tin. The remainder of the elements may be diffused into the matrix material at a first temperature prior to the reaction at a second temperature. A first coating of the remainder of the elements may be diffused into the matrix material at the first temperature and at least a second coating of the remainder of the elements may be diffused into the matrix at the first temperature prior to the reaction at the second temperature. Several coatings may be applied, each being diffused into the matrix material prior to the reaction. The first temperature may be in the range 450° to 800°C, and the second temperature may be in the range 700° to 900°C. The precursor may be passed through a vessel containing the vapour, and the precursor may pass around rotatable cylinders in the vessel. Alternatively, said elements may be electroplated on to the precursor.

The basis for the present invention will now be more particularly described with reference to the manufacture of the intermetallic superconductor compound $Nb_3Sn$. This compound is selected because of its good superconductive properties as regards critical temperature and current-carrying capacity in high magnetic fields, but the principles of the invention apply equally to other intermetallic superconductor compounds.

Accordingly there is manufactured a precursor comprising a plurality of niobium filaments embedded and supported by a matrix of a suitable ductile material, typically copper. This is manufactured for example by providing an extrusion can of copper with a niobium bar to form an assembly, the assembly is closed, preferably after evacuation, and is then extruded at between room temperature and 900°C to form a copper-clad niobium bar. This bar is then drawn through a sequence of reducing dies to produce a copper-clad rod.

The copper-clad rod is then cut into eg. 61 lengths, which are assembled together within a further copper extrusion can which is subsequently evacuated and sealed, the assembly so formed being extruded at between room temperature and 900°C and drawn through a further series of dies to reduce the diameter of each filament of niobium to about 5$\mu$m.

The above sequence of co-working, cutting, assembling and further working can be repeated many times if necessary, and the degree of working varied in order to produce the requisite composite precursor in which in a copper matrix there are provided the required number of niobium filaments each having the requisite diameter. A typical composite precursor consists of a wire of 250$\mu$m diameter of copper containing 244 niobium filaments 5$\mu$m in diameter.

The precursor is then provided with tin as the second element of the eventual superconductive intermetallic compound $Nb_3Sn$, by a technique in which the tin is coated in a number of layers on to the exterior surface of the copper matrix and the copper matrix is homogenised by inward diffusion of tin from the coating. There is subsequently carried out a reaction between at least some of the niobium of the niobium filaments and tin from the matrix to produce $Nb_3Sn$.

The homogeneous matrix consists of a copper-tin alloy, which is a bronze. In forming bronze from copper and tin, intermetallic compounds of copper and tin can be formed in the temperature range 230°–760°C for the bronze composition 10–99at. percent tin, balance copper. However, it is desirable to avoid the formation of intermetallic copper-tin compounds because firstly they embrittle the bronze when randomly distributed therein, and secondly the niobium filaments may present surfaces suitable for heterogeneous nucleation of the compounds, whereupon there is the possibility that intermetallic compounds of niobium, copper and tin can form and thereby inhibit the subsequent formation of $Nb_3Sn$. To avoid these difficulties, the tin is applied from a molten bath at a low temperature to provide little interdiffusion of copper and tin and restrict the formation of intermetallic compounds to a zone 1–2 microns in thickness at the copper-tin interface.

When each layer of tin has been applied to the copper matrix, the matrix is homogenised by heat treatment in the range 400°–1,000°C at the upper end of which there is the least intermetallic formation in the copper-tin system, and the more rapidly is the homogenised state achieved. However, the melting point of the bronze decreases as the tin content increases so as to form a molten surface zone at the tin-copper interface at the commencement of the heat treatment. The extent of the molten zone is determined by the amount of tin applied to the matrix surface prior to this heat treatment. To maintain the geometry of the array of niobium filaments within the copper-matrix as constant as possible, i.e., to preserve the geometric form of the superconductor composite, several thin layers of tin are deposited on to the matrix surface and each one is homogenised with the alloy, rather than there being applied a single thick layer of tin and one homogenisation. At the commencement of each heat treatment there will be produced the thin molten zone, but as the tin diffuses further into the copper matrix and its concentration decreases, the melting point of the liquid zone increases until it exceeds the heat treatment temperature. The matrix is then solid and further homogenisation takes place by solid state diffusion.

To minimise the difficulties that can be encountered with the molten bronze zone, it may be preferable to carry out the initial part of each homogenisation heat treatment at a lower temperature, for example 600°C, and as the tin concentration decreases by diffusion, to raise the heat treatment temperature to for example 800°C. The extent of the molten state would then be minimised and the subsequent solid state diffusion would occur at the maximum temperature.

When there has been produced a matrix bronze of the required tin content, the superconductor composite is heat-treated at a temperature appropriate for the interdiffusion of tin from the bronze, and niobium, to produce $Nb_3Sn$. The temperature at which this heat treatment is to be carried out must fall within the range at which it is possible to produce the particular intermetallic compound $Nb_3Sn$. The reaction temperature also has a major effect upon the purity of the $Nb_3Sn$ and its resulting superconducting properties. Thus it has been found that it is possible for the $Nb_3Sn$ to be contaminated with unreacted niobium or unreacted copper, and therefore to have reduced properties. This is largely overcome by carrying out the heat treatment at as low a temperature, consistent with $Nb_3Sn$ formation, as possible. A further constraint upon the temperature is that it is preferred that the reaction be carried out in the solid phase. This can assist in preventing niobium and copper contamination, and it also ensures that the geometric form of the composite remains constant. Consequently, the composite is heat-treated at 700°–900°C depending upon the composition of the bronze; the higher the copper content of the matrix, the lower should be the reaction temperature to minimise contamination.

In a typical particular example of the invention, there was manufactured a composite precursor comprising 61 niobium filaments embedded in a copper matrix forming a wire having a diameter of 0.02 inch. The composite was immersed in molten tin at 300°C for 10 seconds, whereupon there was produced on its surface a layer of tin having a thickness of 0.0001 inch.

The coated composite was homogenised by heat-treatment at 785°C for 5 minutes.

The tin coating and homogenising treatments were repeated three further times.

The composite was then given a reaction heat-treatment at 840°C for 90 hours which produced a layer of $Nb_3Sn$ having a thickness of 3 microns on each niobium filament 50 microns in diameter.

The superconductor was found to have a critical temperature between 14.2° and 17.6°K. Its current-carrying capacity in various applied fields was measured. The results are presented in Table I.

Table I

| Applied field in Kilogauss | Critical current in Amps |
|---|---|
| 10 | 158 |
| 20 | 88 |
| 30 | 55 |
| 40 | 43 |
| 50 | 31 |
| 60 | 24 |

The lattice parameter was measured and found to be 5.889A, which agrees closely with those given in the literature for $Nb_3Sn$ formed from pure Nb + Sn. Thus the compound formed is similar in structure to $A15Nb_3Sn$.

It may be pointed out that the composite precursor is manufactured with the desired ratio between its niobium and copper contents. By suitable repetition of the coating and homogenising steps, and also the reaction step if necessary, sufficient tin can be absorbed by the matrix and then used in reaction to produce $Nb_3Sn$, to exhaust all of the niobium if that is required.

The typical example described above can be modified to produce semi-continuous manufacture of $Nb_3Sn$. Thus the composite can be continuously traversed firstly through a molten tin bath to produce the tin coating, subsequently through the hot zone of a long tube furnace for homogenising, next through the tin bath a second time, and then homogenised further. After sufficient repetitions of the coating and homogenising stage, the composite can be reacted to form $Nb_3Sn$, normally in a batch process because of the long periods of time that are necessary. Thus the homogenised composite can be wound on spools having a diameter of the order of 25cm and the composite coated with magnesia slurry to prevent welding of the matrices together during the reaction heat-treatment in a suitable furnace.

The typical example can be further modified to produce continuous manufacture of $Nb_3Sn$. In this modification there is used a furnace containing cylinders mounted for driven rotation about a horizontal axis. This is illustrated in the accompanying schematic drawing.

The roof of the furnace 1 is provided with two apertures 2 each above a corresponding end of cylinders 3 and 4. Through the left-hand aperture, as viewed in the drawing, there is fed a length of the composite precursor 12, and this is passed around the lower and upper cylinders and traverses along them to leave the furnace through the right-hand aperture. Each cylinder is approximately 4 inches in diameter and 2 feet in length with 30 turns of precursor around the cylinders per inch of their length, about 1,500 feet of precursor can be accommodated on the cylinders at any one time.

Below the lower cylinder 4 there is located a masking grid 5 through which is provided a large number of parallel slits 6 each opening directly below the cylinder 4. Beneath the masking grid are located four baths 7 to 10 of molten tin heated to, and maintained at, their respective temperatures by induction coils. The left-hand bath 7 is maintained at 1,500°C, and the other baths 8 to 10 at 1,000°C. The ambient temperature of the furnace is maintained at 850°C. The cylinders are rotated by a motor 11 via gear wheels 13, 14 and 15 at such a speed that the precursor travels at 0.5 feet per minute.

Following the passage of the precursor through the furnace, as it is fed on to the left-hand end of the cylinders, it is subjected to tin vapour from the left-hand bath 7, whereby tin at a vapour pressure of $10^{-2}$mm mercury passes through the slits 6 in the masking grid on to the surfaces of the wire passing thereabove. At this vapour pressure the rate of deposition of tin exceeds the rate of solid state diffusion of tin into the copper matrix, and a tin concentration gradient quickly builds up across the radius of the wire. This facilitates the attainment of a matrix that overall contains sufficient tin to form a bronze of the desired composition. After sufficient tin has been applied to the precursor to form the average matrix composition required, the rate of tin supply is reduced to equal that at which tin diffuses through the copper matrix to arrive at the surfaces of the niobium filament or filaments therein by solid state diffusion. This is controlled by limiting the length of the cylinder 4 along which tin is supplied from the left-hand bath 7 at the high temperature of 1,500° C. When the precursor passes above the slits 6 in the masking grid 5 above the baths 8 to 10 maintained at 1,000°C, the vapour pressure of tin is significantly reduced, and tin is supplied at the required rate.

As tin reaches the niobium surfaces, it will react to produce the required superconductor compound $Nb_3Sn$ under the effect of the ambient temperature of 850°C within the furnace. The loss of tin from the precursor is minimal because the vapour pressure of tin at 850°C is about $10^{-9}$mm mercury.

With the speed of the precursor as given above, the total residence time of the wire within the furnace is about 52 hours. This can be adjusted as required.

With this modification, there is continuously produced a superconductor composite containing $Nb_3Sn$ from a precursor of niobium filaments in a copper matrix.

Although the above description relates to copper matrices, there are advantages in certain cases to be gained by starting with a low tin bronze, i.e., less than 7 wt. percent for the original matrix material. The percentage of tin is typically 5 percent, which is below that level at which copper forms intermetallic Cu-Sn compounds. The two main advantages obtained from using bronze rather than copper are:

1. that bronze has a hardness and strength more like niobium than pure copper, and thus the mechanical working proceeds more smoothly during the preparation of the precursor, particularly during the extrusion stage;

2. that during the first heating stage after the first coating of tin has been applied, the tin in the bronze immediately adjacent the niobium filaments combines with the niobium to form a niobium-tin compound which is relatively impervious to copper, and hence reduces the rate of diffusion of copper into the niobium filaments.

As a further alternative, silver may be used as the matrix, although it is more expensive, and thus increases the cost of the product. The main attraction of silver is that it is not so reactive with tin, and does not form as many intermetallic compounds as are found in the Cu-Sn system, and it is much less soluble in niobium than is copper, as is shown by the following Table II.

Table II

| | Cu | | | Ag | | |
|---|---|---|---|---|---|---|
| Solubility in Sn | 0.01at.% at 230°C | | | 0.09at.% at 200°C | | |
| Solubility in Nb | 3.0at.% at 20°C | | | Zero up to 1700°C | | |
| Compounds with Sn | structure | formula | temp range °C | structure | formula | temp range °C |
| | $D_{82}$BCC | $Cu_{31}Sn$ | 350–590 | HCP | $Ag_3Sn$ | 100–180 |
| | Hexagonal | $Cu_{70}Sn_6$ | 580–630 | | | |
| | Orthogonal | $Cu_3Sn$ | 100–630 | | | |
| | Cubic | $Cu_6Sn_5$ | 100–415 | | | |
| Compounds with Nb | none | | | none | | |

It can be seen that there is only one important compound involving Ag and Sn, and this dissociates at temperatures far below the lowest temperature at which $Nb_3Sn$ is stable (approximately 600°C). The solubility of Ag in Nb is important in that impurities in the Nb can produce deleterious effects on the eventual superconducting properties, and since Ag is insoluble in Nb at all working temperatures it does not dissolve to produce the effects found when using a copper matrix, ie a reduction in the superconductive properties of the eventual compound.

This improvement in properties does, however, have to be weighed against the increased cost of the silver, and the increased security risks involved in handling silver. The break-even point clearly will depend on the particular set of economic and technical requirements to be met.

As a further alternative, copper may be used but the temperature at which the initial diffusion technique occurs may be restricted to 550°C, at which temperature the rate of diffusion of copper into the niobium filaments is so low that very little contamination occurs, whilst the rate of diffusion of tin into the copper is still appreciable.

As mentioned above, the main description in this specification has been devoted to the typical example of the manufacture of $Nb_3Sn$. However, it can be applied to other intermetallic compounds of which examples are given in Table III below together with the critical temperature of the compound, the composition and temperature of the coating bath, the matrix metal, the metal of the filaments in the precursor. There are also given the homogenisation temperature, the composition of the homogenised matrix and the reaction temperature.

Table III

| Compound | Critical temperature in °K | Coating bath composition and temperature °C | | Matrix | Filament | Final matrix composition at.% | Matrix homogenisation temperature °C | Reaction temperature °C |
|---|---|---|---|---|---|---|---|---|
| $Nb_3Ga$ | 12.5 | Ga | 100 | Cu | Nb | Cu-18Ga | 700 | 900 |
| $V_3Ga$ | 16.0 | Ga | 100 | Ni | V | Ni-20Ga | 400 | 1200 |
| $Nb_3Al_{0.8}Nb_3Ge_{0.2}$ | 21 | Al-20Ge | 600 | Ni | Nb | Ni-40Al-10Ge | 800 | 1200 |
| $Nb_3Al$ | 21 | Al | 700 | Ni | Nb | Ni-50Al | 800 | 1600 |
| $V_3Si$ | 16 | Aqueous sodium silicate | 20 | Cu | V | Cu-10Si | 800 | 890 |

If required, the bronze or other matrix material can be at least partly removed from the superconductor filaments. For a copper-tin bronze this can be exemplified by chemical reaction or electrolytic anodic dissolution. This process can be applied on a continuous basis by passing the composite through a suitable bath. The composite can then be provided with a copper matrix by being dried and then passed through a bath of molten copper maintained at about 1,100°C under an inert atmosphere. The surface tension produced by the molten copper will suffice to maintain the filaments separate from one another but in a reasonably compact condition.

As an example, there can be taken 0.020 inch diameter bronze matrix wire of 61 filaments twisted about one another and each consisting of $Nb_3Sn$ layer around a niobium core. This wire is passed through a first bath of 75 percent $HNO_3$, 25 percent HCl at 80°C with a residence time of one minute to remove the bronze. The wire passes to a water bath at 80°C with two passes of one minute residence each. After passing through an acetone bath at ambient temperature with a residence time of one minute, the wire is dried in an oven at 150°C with three passes each of one minute duration. The wire is then passed through the molten copper bath at 1,100°C with a residence time of 30 seconds. Aluminum may be used as an alternative material for the matrix in the above process, and those elements which are electroplatable may be electroplated on to the surface of the precursor.

We claim:

1. A method of manufacturing a superconductor incorporating a superconductive intermetallic compound of at least two elements including the steps of:

i. producing an elongated precursor comprising at least one filament of one of said elements embedded in and supported by a ductile matrix material, said matrix material containing substantially none of the remainder of said elements and not entering into chemical reactions with any of said elements, ii. applying a coating containing the remainder of said elements to the exterior of said precursor, homogenizing said matrix by, iii. heating the thus coated precursor to diffuse said remainder of elements into said matrix material, the coating applying and homogenizing steps being repeated at least once, and (iv) subsequently heat treating the homogenized matrix in order to react the thus diffused remainder with the embedded element to form said superconductive intermetallic compound.

2. A method as claimed in claim 1 wherein the precursor comprises niobium filaments in a copper matrix, the precursor is coated with tin and the coated precursor is heated whereby the tin diffuses through the copper matrix and reacts with the niobium filaments to form the superconductive intermetallic compound $Nb_3Sn$.

3. A method as claimed in claim 1 in which the remainder of said elements are applied by vapour deposition on to the matrix material.

4. A method as claimed in claim 2 wherein the tin coating is applied to the precursor from a molten bath of tin at low temperature such as to minimize interdiffusion of copper and tin, said matrix is then homogenized by heating the composite at 400°–1,000°C and the composite is then heat treated to produce the desired $Nb_3Sn$ intermetallic compound, the tin application and homogenizing steps being repeated several times before the heat treatment is effected to react the Nb and Sn to form the desired $Nb_3Sn$.

5. A method as claimed in claim 1 in which the matrix material contains a small portion of the remainder of the elements.

6. A method as claimed in claim 1 in which the matrix material is chosen from the group consisting of copper, silver and nickel.

7. A method as claimed in claim 1 in which the at least one filament is formed of niobium.

8. A method as claimed in claim 1 in which the coating is applied by vapour depositing tin onto the matrix material.

9. A method as claimed in claim 1 in which the remainder of the elements are diffused into the matrix material at a first temperature and the reaction takes place at a second temperature.

10. A method as claimed in claim 9 in which at least three separate coatings of the remainder of the elements are diffused into the matrix material at the first temperature.

11. A method as claimed in claim 10 in which the first temperature is in the range 450° to 800°C, and the second temperature is in the range 700° to 900°C.

12. A method as claimed in claim 3 in which the precursor is passed through a vessel containing the vapour.

13. A method as claimed in claim 12 in which the precursor passes around rotatable cylinders in the vessel.

14. A method as claimed in claim 1 in which the said remainder of said elements are electroplated on to the precursor.

* * * * *